United States Patent [19]

Heinold

[11] 4,456,266
[45] Jun. 26, 1984

[54] THROTTLE BUSHING

[75] Inventor: George H. Heinold, San Jose, Calif.

[73] Assignee: General Electric Company, San Jose, Calif.

[21] Appl. No.: 489,555

[22] Filed: Apr. 28, 1983

Related U.S. Application Data

[63] Continuation of Ser. No. 330,588, Dec. 14, 1981, abandoned.

[51] Int. Cl.³ .......................... F16J 15/00; F16J 15/16
[52] U.S. Cl. ...................................... 277/24; 277/134; 277/203
[58] Field of Search .................. 277/133, 134, 135, 3, 277/203, 24

[56] References Cited

U.S. PATENT DOCUMENTS

| | | |
|---|---|---|
| 1,877,495 | 9/1932 | Cater . |
| 1,961,029 | 5/1934 | Benedek . |
| 2,831,737 | 4/1958 | Jacoby . |
| 3,131,940 | 5/1964 | Ertaud ................................ 277/134 |
| 3,232,683 | 2/1966 | Tomamoto . |
| 3,331,101 | 7/1967 | Thomas ............................. 277/134 |
| 3,963,247 | 6/1976 | Nommensen ...................... 277/134 |
| 4,010,960 | 3/1977 | Martin ............................... 277/203 |
| 4,384,725 | 5/1983 | Nenou ................................... 277/3 |
| 4,398,726 | 8/1983 | Heisler .............................. 277/203 |
| 4,407,511 | 10/1983 | Benton ................................ 277/24 |

*Primary Examiner*—Robert I. Smith
*Attorney, Agent, or Firm*—Ivor J. James, Jr.; Samuel E. Turner; Raymond G. Simkins

[57] ABSTRACT

A pump system wherein a pressure drop exists across a throttle bushing surrounds a rotating shaft. The throttle bushing comprises an internal annular debris-collecting groove disposed inwardly from the higher pressure end of the bushing and in communication with an internal helical groove extending across the bushing to the opposite low pressure end thereof. The outer wall of the annular debris-collecting groove, the higher pressure end of the bushing, and the internal annular surface of the bushing therebetween all cooperate in defining a lip which deters oversized debris from entering between the lip of the shaft surface. The lip, helical groove and annular debris-collecting groove cooperate to purge the bushing of debris and thus enhance the efficiency and wear life of the bushing.

2 Claims, 3 Drawing Figures

THROTTLE BUSHING

This is a continuation of application Ser. No. 330,588, filed Dec. 14, 1981, now abandoned.

BACKGROUND OF THE INVENTION

This invention relates generally to throttle bushings in various types of pump systems and the like in which the throttle bushing surrounds at least a portion of a rotating shaft, and more particularly to a new and improved throttle bushing including improved means for preventing the entrance of foreign materials such as debris, contaminants, and other undesirable substances between the shaft and bushing and for expelling such materials which nonetheless enter therebetween.

Pump systems can be considered to straddle differential pressure zones or regions of relatively low and high pressure. Rotating shafts in the pumps are frequently employed to drive water or other fluids between these low and high pressure zones. In many cases, the low pressure zone is below atmospheric pressure. Driving or pumping water can for instance be accomplished by rotating impellers mounted on the shaft as shown in FIG. 1 below.

Since the shaft itself is exposed to each of these pressure zones (low and high), the water or fluid being pumped tends undesirably to leak or pass along the surface of the shaft. This tends not to conform to the primary or desired flow scheme for which the pumps are designed, even though it is known and somewhat inevitable that some leakage will be present in all systems. Seals are normally provided to control leakage flow of water or fluid along a shaft. However, seals generally are effective only for handling small pressure differentials for pressure differentials more than about 5 psi, more than only seals for preventing leakage are required. Otherwise, the seal itself will be damaged by the flow of water driven under high pressure. This causes the pump to become inoperable within an unreasonably short term or period of time, when exposed to excessively high pressure drops.

Accordingly, the use of bushings with seals rather than as an alternative to seals controlling high pressure leakage along the shaft surface has come into use. The higher the pressure differential traversed by the shaft, the more important is the bushing and its operational design or construction.

Aside from preventing leakage, the bushing can contribute to the lubrication of bearing surfaces for the rotating shaft. Additionally, the bushing can provide a structure through which cooling ducts can carry away heat generated during pumping operation, which might otherwise interfere with proper operation of the pump equipment according to its design requirements.

One notable problem encountered in pump systems employing rotating shafts arises from the presence of debris and solid contaminants in the fluid being pumped. Such contaminants can range from substances or materials such as dirt and sand to metal turnings and rust. These can lodge between the bushing and the shaft, damaging the metal surfaces on both the inner side of the bushing and the outer side on the shaft itself. This may additionally cause irregularities such as "galling." These irregularities permit unacceptable amounts of leakage along the bushing surface. Furthermore, debris or other materials lodged between the bushing and the shaft can cause the shaft to bind and lock, possibly causing complete failure of the pump system during operation.

To resolve such problems, grooves of various configurations such as a helical pattern have heretofore been formed in bushings to collect and expel undesirable material that enters the bushing. Additionally, in one instance, a circumferential end recess had been formed in a bushing, but this recess was larger than the connected helical groove. The larger recess allowed oversized debris to enter between the bushing and the shaft and lodge at the mouth of the helical groove. All of the prior grooved bushings share common problems with respect to oversized debris. The grooves cannot handle any debris larger than the cross-sectional areas of the grooves themselves and thus, when larger debris enter the pump system, it lodges between the inner bushing surface and the shaft surface and causes the above-mentioned irregularities and galling.

Another problem remaining in the field is the build-up of debris due to insufficient flushing action whereby the debris is not disposed of quickly enough.

An additional problem occurs when the bushing and the shaft are made of like materials. If the like materials are used, for instance type 410 stainless steel, the affinity of the metal for itself will cause a transfer of metal between the inner bushing surface and the shaft, raising metal burrs on the bushing and shaft, as well as creating more debris.

In light of the above problems, an object of this invention is to provide a bushing effective for deterring relatively large chunks of debris from ever entering between the bushing and the shaft.

Another object of the invention is to collect debris which enters at the higher pressure end of the bushing and to quickly pass the debris to the lower pressure end of the bushing for expelling it, in order to avoid damage to the inner bushing surface and the outer surface of the shaft.

SUMMARY OF THE INVENTION

In accordance with the invention, the foregoing and other objects are realized by providing a throttle bushing for receiving a rotary shaft in a high pressure pump system or the like, wherein an internal annular debris-collecting groove is disposed inwardly a predetermined distance from the high pressure end of the bushing and communicates with an internal helical groove extending along the length of the bushing in the direction of the normal rotation of the shaft and to the low pressure end of the bushing. Additionally, the annular debris-collecting groove, the higher pressure end of the bushing, and the internal annular surface of the bushing all cooperate in defining a lip which deters entrance of debris larger than the distance between the inner surface of the lip and the outer surface of the shaft at any given position of the shaft in the bushing.

The embodiment of these elements in the throttle bushing allows the pump system to operate with minimal wear of the bushing and the shaft, while quickly expelling any debris that might enter between the bushing and the shaft.

DETAILED DESCRIPTION OF THE INVENTION

Figure 1:
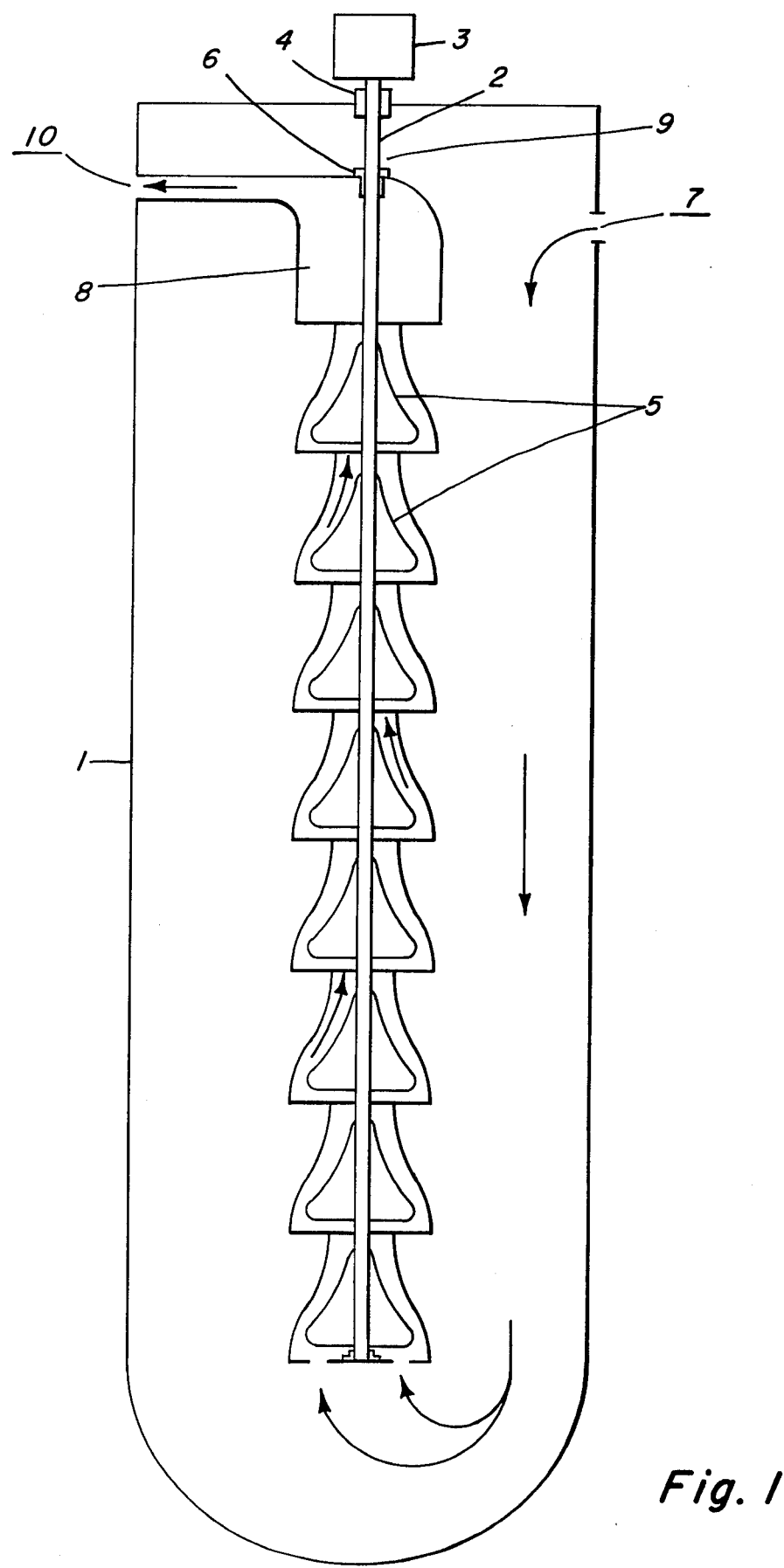
FIG. 1 is a schematic illustration of a pump system of a type in which the present invention is particularly adaptable.

FIG. 1 illustrates a pump system comprising a housing 1 enclosing a shaft 2 driven by a motor 3. The shaft 2 enters the housing through an appropriate seal 4 and in the housing is connecting to a series of impellers 5 which cooperatively define a propulsion chamber. The number of impellers contained in the housing and defining the propulsion chamber can vary with particular pump systems and a system with eight impellers is shown for example only. A throttle bushing 6 is shown at the point where it enters the propulsion chamber. In this system, water enters through an inlet 7 and is drawn into the propuslion chamber near the bottom of the housing as indicated by the arrows shown. At each impeller stage, the fluid, in this case water, is propelled and accelerated upward to the next impeller stage, and so on, until it reaches a region 8 adjacent the throttle bushing 6 where the pressure might, for example, reach approximately 1500 lbs/sq. in. At this point, in a region 9 on the opposite side of the bushing, the pressure can, for example be approximately 5 lbs/sq. in. After the fluid passes through the last impeller stage within the propulsion chamber, it is discharged from the housing through an outlet 10 and is directed to the rest of the system.

Figure 2:
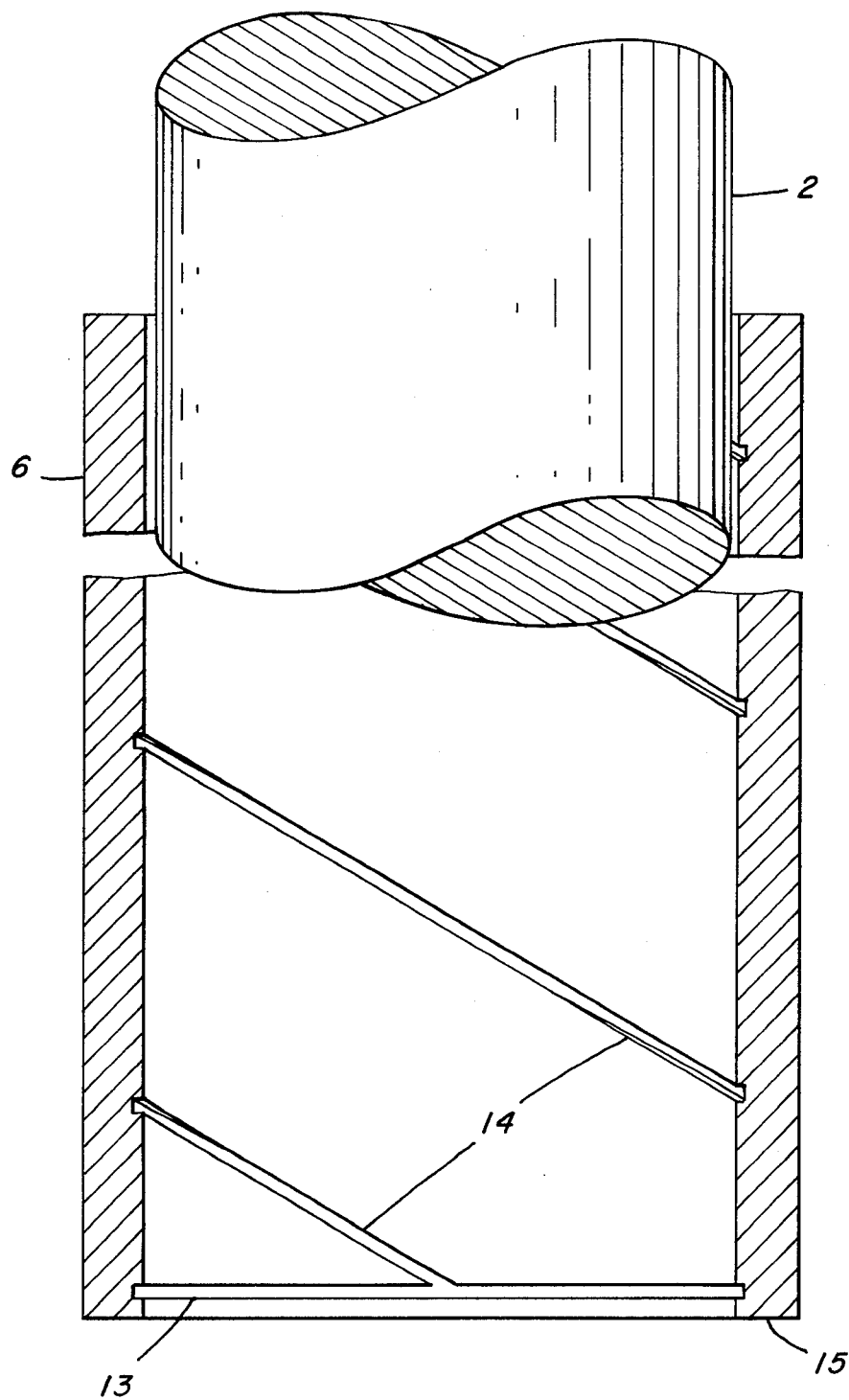
FIG. 2 is an enlarged fragmentary longitudinal sectional view of a throttle bushing incorporating an embodiment of the present invention.

As seen in FIG. 2, a shaft 2 is supported by the present invention, which comprises a throttle bushing 6 having an annular debris-collecting groove 13 formed in the internal surface thereof a predetermined distance from the high pressure end of the bushing. Cooperating and communicating with the annular groove 13 is a helical groove 14 which extends along the full length of the bushing, beginning at the higher pressure end of the bushing, where it is in communication with the annular groove 13, and ending at the lower pressure end of the bushing 16. The direction of the generation of the helical groove 14 is from high to low pressure and is the same as the direction of normal rotation of the shaft 2; thus the helical groove 14, in cooperation with the annular groove 13, under a fluid pressure differential drop, quickly expels debris from the bushing. Both the debris-collecting groove 13 and the helical groove 14 have rectangular cross-sectional shapes, with two spaced side walls and a bottom wall. An annular lip 15 is defined by the outer side wall of the annular debris-collecting groove 13, the outer high pressure end of the throttle bushing 6, and the internal annular bearing surface. The lip 15 obstructs entry into the annular groove 13 of debris which is larger than the distance between the shaft and the lip surface. The radial length of the lip 15 can be varied by varying the inner diameter of the bushing bore at the lip. Any change in the inner diameter of the lip will result in a change of the size of debris that can enter into the annular debris-collecting groove 13; thus, this type of bushing can be adapted to many types of systems subjected to various sizes of debris. Once any debris passes the lip 15 and enters the annular debris-collecting groove 13, the debris will follow along the groove until it reaches the helical groove 14. The debris will then pass through the helical groove 14 and be expelled at the opposite end of the bushing on the lower pressure end thereof.

Figure 3:
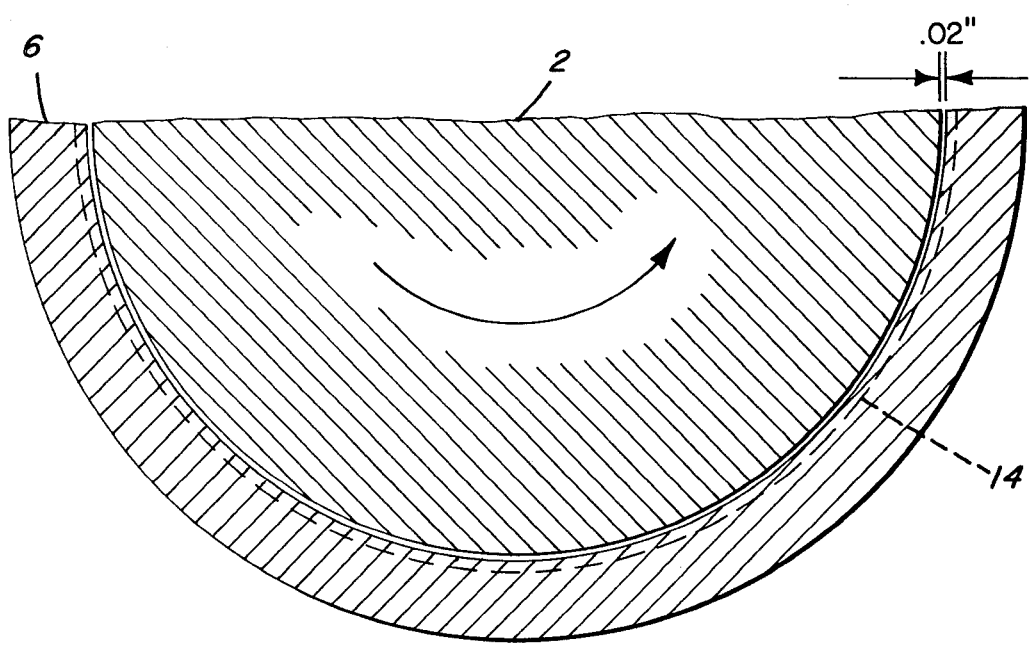
FIG. 3 is an enlarged fragmentary cross-sectional view of the throttle bushing and a shaft positioned therein.

As seen in FIG. 3, a gap exists between the shaft 2 and the inner surface of the lip 15. The gap represents the upper limit of the size of debris that will be able to pass between the shaft 2 and the lip 15 and into the annular debris-collecting groove 13 for being passed on through the helical groove 14 of the bushing.

The throttle bushing may, for example, be made of stainless steel and preferably of Nitronic 60 ® or Ni-Resist ® material. The high carbon and alloy content of these materials lends strength to the structure into which they are fabricated. They are additionally considerably corrosion and wear-resistant. Ni-Resist is defined at pg. 502 in Handbook of Chemical Synonyms and Trade Names by W. Gardner et al. (CRC Press, Inc. of Cleveland, Ohio; Eighth Ed. 1978) as a corrosion and heat resisting cast iron containing 12 to 15 percent nickel, 5 to 7 percent copper, and 1.5 to 4 percent chromium. Nitronic 60 is the subject of U.S. Pat. No. 4,337,088 granted June 29, 1982 to inventor E. L. Moses, Jr. The ingredients of Nitronic 60 are specified therein as including 0.10C, 7.0/9.0Mn, 3.50/4.50si, 16.00/18.00Cr, 8.00/9.00Ni, and 0.08/0.18N.

The shaft in the preferred embodiment is made of 410 stainless steel and the use of a Nitronic 60 or Ni-Resist throttle bushing in conjunction therewith tends to prevent surface contact reaction or transfer of metal between the throttle bushing and the shaft during operation. The inner diameter of the throttle bushing can, for example, be 5.5 inches. The depth of both the helical groove 13 and the annular debris-collecting groove 14, and the width of the lip 15 can be 0.125 inches and the maximum gap between the pump shaft and the inner surface of the lip can be 0.02 inches. These dimensions are examplatory only and can vary in accordance, for example, with the shaft size and the expected size of debris in any particular application. The herein disclosed throttle bushing is particularly effective in resolving several problems often encountered in the field of pump systems. In particular, the lip 15 effectively obstructs oversized debris from entering the throttle bushing and thus avoids problems that can result therefrom, namely, wear of the cooperating surface and undesirable build-up of metal on the shaft or bushing. Additionally, the presence of the annular debris-collecting groove 13 and the helical groove 14 generated in the direction of normal rotation of the pump shaft under fluid pressure differential conditions will quickly expel debris that passed the lip.

While only one embodiment of the invention has been shown, a person skilled in the art will appreciate from the foregoing that modifications may be made. As noted above, varying the inner diameter of the lip 15 will allow for various sizes of debris to be barred from entering the bushing. Additionally, the annular debris-collecting groove 13 and the helical groove 14 can be altered in depth, cross-sectional area of configuration to accommodate varying sizes and shapes of debris that may pass by the lip 15. Therefore, while the invention has been described with reference to a particular embodiment, it is to be understood that modifications may be made without departing from the spirit of the invention or from the scope of the claims.

What is claimed is:

1. A throttle bushing for a rotating shaft extending between relatively high and low pressure zones, said throttle bushing comprising a tubular member having an internal surface surrounding said shaft; an annular, debris-collecting groove formed in said internal surface close to the high pressure end of said tubular member; and a debris discharging helical groove formed in said internal surface in communication with said debris-collecting groove and extending to the low pressure end of said tubular member, the direction of generation of said helical groove from the high to the low pressure end of said tubular member being the same as the direction of rotation of said shaft, said helical groove being open at the low pressure end of said tubular member whereby debris collected by said annular groove and moved by said helical groove is discharged from between said shaft and said tubular member at said low pressure end, said debris-collecting groove being disposed a short distance from said high pressure end of said tubular member, the wall of said debris-collecting groove toward said high pressure end forming an annular lip effective as a barrier to debris having dimensions greater than the separation between said lip and said shaft, the separation between said lip and said shaft being less than the depth of said annular groove.

2. A throttle bushing for a rotating shaft extending between differential pressure zones comprising a tubular member having an internal surface surrounding at least a portion of said shaft, an annular debris-collecting groove formed in said internal surface a short distance from the high pressure end of said tubular member, a helical groove in said internal surface communicating with said annular groove and generated from the high pressure end to the low pressure end of said tubular member in the same direction as the normal rotation of said shaft for expelling debris out of the lower pressure end of said tubular member, and an annular lip defined by said annular debris-collecting groove and the high pressure end of said tubular member effective as a barrier to debris tending to enter said debris-collecting groove from the region of the high pressure end of said tubular member, the gap between said lip and said shaft being less than the depth of said annular groove, said shaft being formed of a stainless steel and said tubular member being formed of a material selected from the group consisting of Nitronic 60 ® and Ni-Resistant ®.

* * * * *